United States Patent
Kamata

(10) Patent No.: US 9,232,625 B2
(45) Date of Patent: Jan. 5, 2016

(54) INVERTER DEVICE, PLASMA GENERATOR APPARATUS AND CONTROL METHOD

(71) Applicant: Hisahiro Kamata, Kanagawa (JP)

(72) Inventor: Hisahiro Kamata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/657,961

(22) Filed: Mar. 13, 2015

(65) Prior Publication Data

US 2015/0271906 A1 Sep. 24, 2015

(30) Foreign Application Priority Data

Mar. 18, 2014 (JP) ................. 2014-055657

(51) Int. Cl.
| | | |
|---|---|---|
| *H05H 1/24* | (2006.01) | |
| *H02M 7/537* | (2006.01) | |
| *H02M 1/00* | (2007.01) | |
| *H02M 3/335* | (2006.01) | |

(52) U.S. Cl.
CPC . *H05H 1/24* (2013.01); *H02M 1/00* (2013.01); *H02M 3/335* (2013.01); *H02M 7/537* (2013.01); *H02M 2001/0006* (2013.01)

(58) Field of Classification Search
CPC ................. H02M 3/33507; H02M 2001/0058; H02M 2001/0009; H02M 3/156; H05B 33/0815
USPC ................. 363/19, 21.01, 21.03, 21.04, 21.08
See application file for complete search history.

(56) References Cited

U.S. PATENT DOCUMENTS

| | | |
|---|---|---|
| 6,239,559 B1 | 5/2001 | Okamoto et al. |
| 7,944,652 B2 | 5/2011 | Fukumoto |
| 2009/0001944 A1 | 1/2009 | Kim et al. |
| 2011/0235382 A1 | 9/2011 | Kamata |
| 2012/0163058 A1 | 6/2012 | Kamata |
| 2012/0236614 A1 | 9/2012 | Kamata |
| 2014/0268966 A1 | 9/2014 | Kamata |

FOREIGN PATENT DOCUMENTS

| | | |
|---|---|---|
| JP | 2524942 | 5/1996 |
| JP | 3353684 | 9/2002 |
| JP | 2006-81263 | 3/2006 |
| JP | 2009-11144 | 1/2009 |
| JP | 4627320 | 11/2010 |
| JP | 2012-135112 | 7/2012 |
| WO | 2007/060941 | 5/2007 |

*Primary Examiner* — Tuyet Vo
(74) *Attorney, Agent, or Firm* — Duft Bornsen & Fettig LLP

(57) ABSTRACT

An inverter device includes a switching device which performs on-off switching of an input voltage, a step-up transformer which applies an excitation current to its winding during a switching-device-on period and outputs an output voltage during a switching-device-off period, an input-voltage detector which detects the input voltage and output an input-voltage detection signal, an output voltage detector which detects the output voltage and output an output-voltage detection signal, an output-produced-period detector which detects a period when the output voltage is produced based on the output-voltage detection signal, a comparator which detects a period when the output-voltage detection signal exceeds the input-voltage detection signal and output information indicating the output-high period, and a shifting unit which shifts the information indicating the output-high period to a next period when absence of the output produced period is detected. The control unit adjusts the switching-device-on period based on information indicating the shifted output-high period.

10 Claims, 4 Drawing Sheets

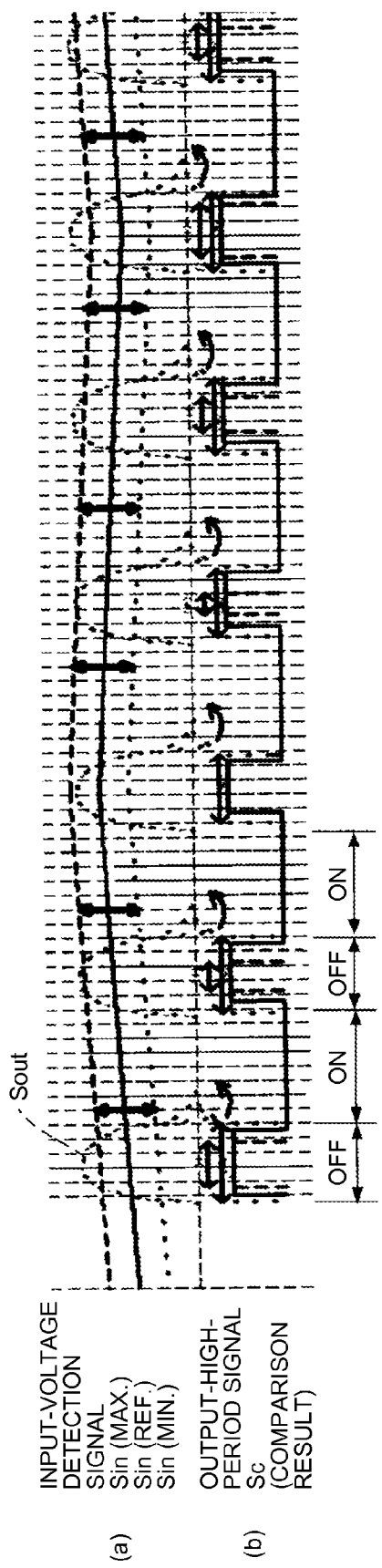

INVERTER DEVICE, PLASMA GENERATOR APPARATUS AND CONTROL METHOD

CROSS-REFERENCE TO RELATED APPLICATIONS

The present application claims priority to and incorporates by reference the entire contents of Japanese Patent Application No. 2014-055657 filed in Japan on Mar. 18, 2014.

BACKGROUND OF THE INVENTION

1. Field of the Invention

The present invention relates generally to an inverter device that performs on-off switching of an input voltage using a switching device so that an excitation current is applied to an excitation winding of a step-up transformer in ON period of the switching device and an output voltage exhibiting a half-wave alternating-current (AC) waveform is delivered from an output winding of the step-up transformer in OFF period of the switching device, a plasma generator apparatus including the inverter device and a control method employed in the inverter device.

2. Description of the Related Art

A switching regulator or an inverter device is used to supply high voltage to a variety of device such as a discharge tube for a large plasma display or a plasma generator apparatus.

Inverter devices that deliver output power of several watts are in common use. However, inverter devices that deliver AC output whose voltage is over ten kilovolts and whose power value is several tens of watts or higher are employed in plasma generator and the like.

A general switching regulator (DC-DC converter) intermittently applies a direct-current (DC) voltage to a primary excitation winding of a voltage-converting transformer by on-off switching the DC voltage using a switching device, and rectifies and smooths an AC current generated in a secondary output winding of the transformer, thereby outputting a DC voltage.

The output voltage is kept at a constant voltage by, for example, pulse-width modulation (PWM) control that controls a ratio (duty ratio) between switching-device-on time and switching-device-off time. The PWM control is performed by detecting the output voltage and producing a feedback voltage based on the detected voltage as disclosed in Japanese Laid-open Patent Application No. 2009-11144, for example.

More specifically, the output voltage is controlled to be constant by increasing ON width of switching pulse when the output voltage drops to thereby compensate for low output power, while reducing the ON width when the output voltage rises to thereby curtail excessively high output power.

As described above, an inverter device intermittently applies a DC voltage to a primary excitation winding of a voltage-converting transformer by on-off switching the DC voltage using a switching device, but delivers an AC voltage generated in a secondary output winding as it is to a load.

Some type of such an inverter device is configured to apply PWM control to the switching device by detecting the output current rather than the output voltage and replacing the detected output current with a voltage corresponding thereto. An example of such an inverter device is disclosed in published Japanese translation of WO2007/060941.

Such a technique disclosed in Japanese Laid-open Patent Application No. 2009-11144 that performs PWM control of a switching pulse for use in on-off control of a switching device by detecting an output voltage is applicable to switching regulators that output DC voltages. Furthermore, because switching regulators have a holding time provided by an electrolytic capacitor or the like in a smoothing circuit on the output side, a problem in control responsiveness does not arise in a switching regulator.

By contrast, because inverter devices deliver AC output, it is difficult to control an inverter device so as to deliver output voltage having a constant crest value (peak voltage value) irrespective of whether the output voltage is a full-wave voltage or a half-wave voltage.

In a condition where an inverter device has a fixed load, and duty ratio, switching frequency, resonant frequency, input voltage, and like circuit conditions that depend on the load are fixed, it can be assumed that change in crest value of output voltage will depend only on an environmental change and a secular change of components. Nevertheless, it is desirable that the crest value of the output voltage is kept approximately constant even if the load varies with temperature, elapsed time, or the like. It is further desirable that a substantially-constant output voltage can be obtained even if the input voltage varies or the load varies dynamically.

Meanwhile, an instantaneous peak output voltage and large difference between the peak and a valley of the voltage make the number of devices necessary for detecting the output voltage large. As a result, a delay in control response time is caused by a parasitic inductance. The effect of the delay becomes more noticeable as the frequency of repetition of the output voltage waveform increases and the crest value drops or rises excessively as the frequency is high.

At worst, the delay can cause resonant frequency drift. If an excitation current of ON period of a next switching cycle flows through the inverter device to which a resonating voltage is being applied, energy of a residual voltage can produce an excessive current, thereby causing resonance to be lost. As a result, electric power exceeding a maximum power rating of the switching device may damage the switching device or transformer saturation may occur.

Thus, use of an inverter device that delivers AC output having a switching frequency of as high as several tens of kilohertz and having a crest value of output voltage as high as over ten kilovolts, which is achieved by making use of voltage resonance, can arise not only a problem of the control responsiveness described above but also problems related to withstand voltages of an output-voltage detector and components, a time period during which the resonance is to be completed, and the like.

However, in such an inverter device as described above, it has been typical that output voltage is not monitored constantly but merely adjusted to an input supply voltage manually set in advance.

Under the circumstances, there is a need for an inverter device that controls its AC output voltage so as to have a constant crest value even when its input voltage varies.

It is an object of the present invention to at least partially solve the problems in the conventional technology.

SUMMARY OF THE INVENTION

It is an object of the present invention to at least partially solve the problems in the conventional technology.

There is provided an inverter device that includes a switching device configured to perform on-off switching of an input voltage in accordance with on-off control provided by a control circuit; a step-up transformer including an excitation winding and an output winding and configured to apply an excitation current to the excitation winding during a period in which the switching device is on but output an output voltage exhibiting a half-wave alternating-current waveform from the output winding during a period in which the switching device is off; an input-voltage detector configured to detect a state of the input voltage by detecting a voltage value of the input voltage; an output voltage detector configured to detect a state of the output voltage by detecting an instantaneous voltage value of the output voltage; an output-produced-period detector configured to detect an output produced period during which the output voltage is produced based on the output-voltage detection signal output from the output-voltage detector; a comparator configured to detect an output-high period during which the output-voltage detection signal exceeds the input-voltage detection signal by making comparison between the input-voltage detection signal output from the input-voltage detector and the output-voltage detection signal output from the output-voltage detector; and a shifting unit configured to shift the information indicating the output-high period detected by the comparator to a next period in which the output-produced-period detector detects absence of the output produced period, and the control circuit is configured to adjust the period in which the switching device is to be switched on based on information indicating a shifted output-high period, the shifted output-high period being the output-high period shifted by the shifting unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a timing chart illustrating a relationship between level fluctuation and output-high-period signal according to a second embodiment when an input-voltage detection signal is caused to vary linearly.

DETAILED DESCRIPTION OF THE PREFERRED EMBODIMENTS

Exemplary embodiments of the present invention are specifically described below with reference to the accompanying drawings.

Figure 1:
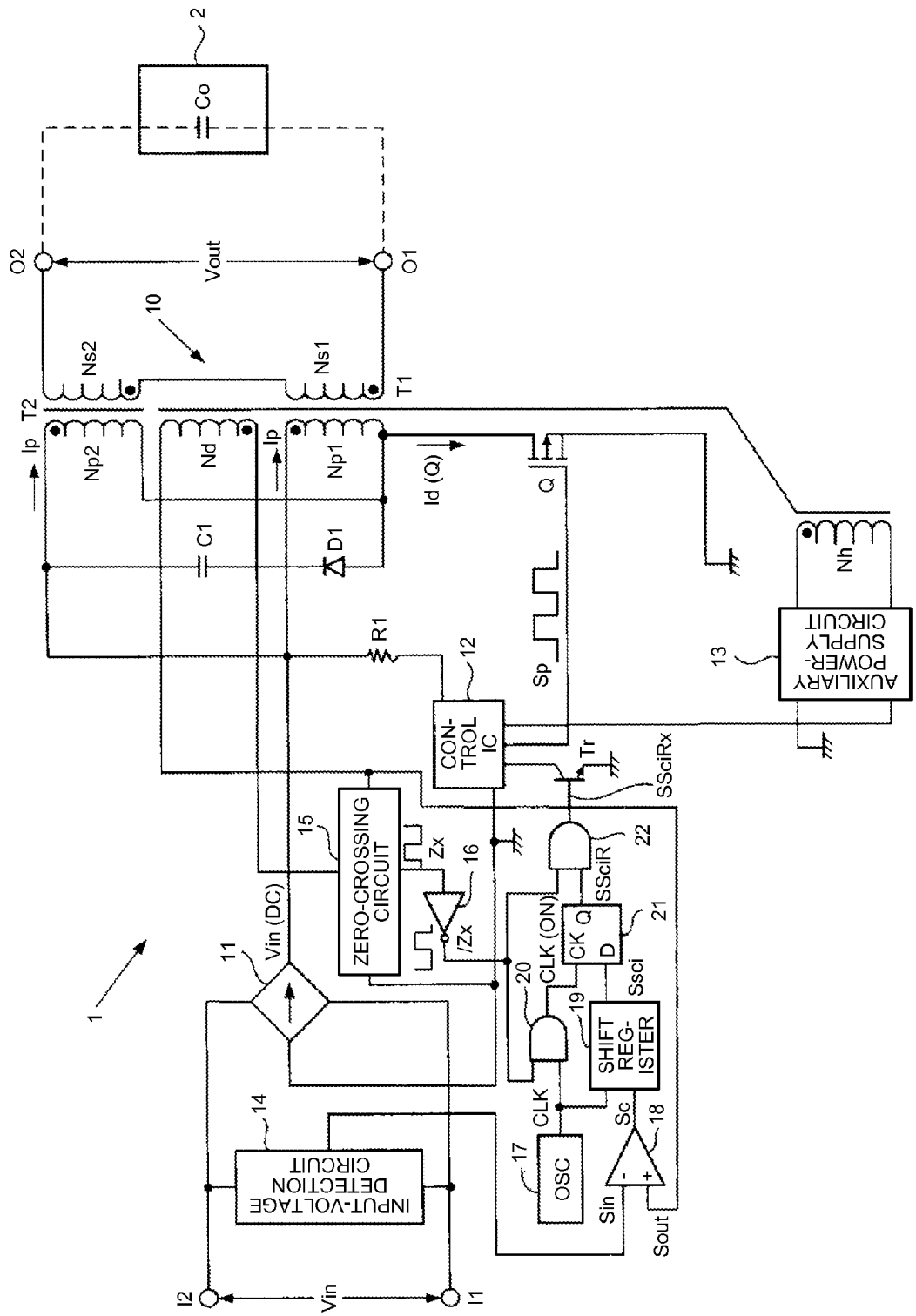
FIG. 1 is a circuit diagram illustrating an inverter device according to a first embodiment of the present invention and a plasma generator apparatus including the inverter device.

FIG. 1 is a circuit diagram illustrating an inverter device according to a first embodiment of the present invention and a plasma generator apparatus including the inverter device.

An inverter device 1 includes, as its basic configuration, a step-up transformer 10, a switching device Q that switches on-off of an excitation current to be applied to the step-up transformer 10, and a control IC 12 which is the control circuit that controls on-off of the switching device Q. An FET (field-effect transistor) may be used as the switching device Q. The control IC 12 applies a switching signal Sp, which is a rectangular pulse, to gate of the switching device Q, thereby performing PWM on-off control of the switching device Q. The inverter device 1 further includes a full-wave rectifier circuit 11 that provides full-wave rectification of an AC input voltage Vin applied from a commercial power source via input terminals I1 and I2.

In the first embodiment, the step-up transformer 10 includes a plurality of transformers T1 and T2 identical in characteristics and each having an independent core.

The transformers T1 and T2 include, respectively, excitation windings Np1 and Np2 that are parallel-connected. The pulsating input voltage Vin(DC) undergone the full-wave rectification provided by the full-wave rectifier circuit 11 is subjected to on-off switching performed by the switching device Q under on-off control provided by the control IC 12 so that an excitation current Ip is applied to the excitation windings Np1 and Np2 simultaneously. Control is provided so that the voltage induced in an output winding Ns1 of the transformer T1 and that in an output winding Ns2 of the transformer T2 in OFF period of the switching device Q have time-synchronized waveforms. The output windings Ns1 and Ns2 are series-connected to deliver an output voltage Vout exhibiting a half-wave AC waveform, which is a result of superimposition of the output voltages of the output windings Ns1 and Ns2, to a load 2 between output terminals O1 and O2.

A series circuit, in which a capacitor C and a diode D are series-connected, is connected in parallel with the parallel circuit of the excitation windings Np1 and Np2 of the transformers T1 and T2 to form a snubber circuit. R1 denotes a resistor for applying a starting voltage to the control IC 12 from the input voltage Vin(DC).

Each of the transformers T1 and T2 is desirably a resonant transformer that resonates in a resonant circuit having an inductance Ls and a distributed capacitance Cs of the output winding Ns1, Ns2 and a load capacitance Co of the load 2 and delivers an output voltage proportional to sharpness of the resonance.

In the first embodiment, the load 2 includes a discharging unit including a discharge electrode and a counter electrode for generating plasma. The AC voltage output from the inverter device 1 is applied across the discharge electrode and the counter electrode, thereby generating plasma. The load 2 has the load capacitance Co between the discharge electrode and the counter electrode.

A dielectric is interposed between the discharge electrode and the counter electrode. When a voltage higher than 6 kV is applied at atmospheric pressure to the discharging unit, a streamer discharge (which may also be referred to as a dielectric barrier discharge, a surface discharge, or a silent discharge), which is one type of the plasma discharge, occurs. The streamer discharge generates plasma containing a large amount of active chemical species such as radicals.

Accordingly, the inverter device 1 and the discharging unit, or the load 2, illustrated in FIG. 1 make up a plasma generator apparatus according to an embodiment of the present invention.

The transformer T1 which is one of transformers that make up the step-up transformer 10 includes, in addition to the excitation winding Np1 and the output winding Ns1, an auxiliary winding Nh and a tertiary winding (which may be referred to as "sub-winding") Nd arranged on the same core as that of the excitation winding Np1 and the output winding Ns1. A voltage is induced in the auxiliary winding Nh during when an excitation current flows through the excitation winding Np1. The voltage is rectified and smoothed by an auxiliary power-supply circuit 13 and fed to the control IC as operating power supply.

In OFF period of the switching device Q, the tertiary winding Nd produces a voltage exhibiting a waveform whose crest value is lower than that of the output voltage Vout in synchronization with the output voltage Vout, which is produced across the series circuit of the output windings Ns1 and Ns2, exhibiting the half-wave AC waveform. The thus-generated voltage is used as an output-voltage detection signal Sout which will be described later.

The coil turns of the tertiary winding Nd is by far smaller than the coil turns of the output winding Ns1. When the output voltage Vout is a high voltage (600 V to 7 kV) or a particularly high voltage (higher than 7 kV), the crest value of the voltage generated in the tertiary winding Nd is desirably equal to or lower than one-hundredth of the output voltage and, more preferably, lower than approximately one-thousandth of the same. The tertiary winding Nd of the transformer T1 described above is the output voltage detector that detects a state of the output voltage by detecting an instantaneous value of the output voltage. How the output voltage detector is used will be described later.

According to the first embodiment, the coil turns of the output windings of the whole step-up transformer 10 can be increased without increasing the turns ratio between the excitation windings and the output windings considerably by employing a large step-up transformer. Accordingly, a high voltage can be obtained with a high step-up ratio stably and safely.

The number of the transformers that make up the step-up transformer 10 may be equal to or larger than three. Connecting the output windings of the plurality of transformers parallel to one another produces an output voltage equivalent to that of a configuration including a single transformer but allows, by virtue of output current to be increased by a magnification ratio of a product of the output current and the number of transformers, to obtain output power equivalent to that obtained from a configuration in which the output windings are series-connected.

Alternatively, a configuration in which the excitation windings of the plurality of transformers are series-connected and the excitation current is simultaneously applied to the excitation windings may be employed.

The auxiliary winding Nh and the tertiary winding Nd are arranged on one of the plurality of transformers that make up the step-up transformer 10. Accordingly, it is difficult to make the plurality of transformers completely identical in characteristics. However, this does not matter because output power of the auxiliary winding, the tertiary winding, and the like is small.

The output-voltage detection signal Sout may alternatively be obtained in the following manner. Any one of the plurality of transformers that make up the step-up transformer 10 is tapped so that a part of the output windings produces, as the output-voltage detection signal Sout, a voltage exhibiting a waveform whose crest value is lower than that of the output voltage Vout in synchronization with the output voltage Vout.

Note that forming the step-up transformer of a plurality of transformers is not essential to embodiments of the invention, and the step-up transformer may be formed of a single transformer.

The inverter device according to the first embodiment includes, as a feature of the present invention, units for controlling AC output voltage so as to have a constant crest value even when input voltage varies. One of the units is the output voltage detector that detects a state of the output voltage by detecting a real-time voltage value of the output voltage using the tertiary winding Nd of the transformer T1 described above.

Even if the output voltage Vout has a frequency as high as 15 kHz to 20 kHz and a crest value as high as 10 kV or higher, the voltage generated in the tertiary winding Nd fluctuates in the same manner as the output voltage in synchronization therewith. Therefore, the tertiary winding Nd allows faithfully to detect a real-time voltage value (i.e., instantaneous voltage value) of the output voltage Vout.

The inverter device 1 includes an input-voltage detection circuit 14 as the input voltage detector that detects a state of the input voltage Vin by detecting a voltage value thereof. The input-voltage detection circuit 14 includes, for example, a transformer which steps down the input voltage Vin from the commercial power source and a full-wave rectifier circuit that provides full-wave rectification of the stepped-down AC voltage. The input-voltage detection circuit 14 outputs the stepped-down AC voltage undergone the full-wave rectification as an input-voltage detection signal Sin.

The inverter device 1 may alternatively include, as the input voltage detector, a circuit that obtains the input-voltage detection signal Sin by dividing the input voltage Vin(DC) having undergone the full-wave rectification provided by the full-wave rectifier circuit 11 using resistors.

The input voltage can be detected using a variety of means because the input voltage is not generally high. Note that it is desirable to adjust the fluctuation level of the input-voltage detection signal Sin and that of the output-voltage detection signal Sout so that the input-voltage detection signal Sin falls within a range of crest values of the output-voltage detection signal Sout as much as possible.

The inverter device 1 further includes a zero-crossing circuit 15 as the output-produced-period detector that detects, for each switching cycle of the switching device Q, an output produced period in which the output voltage Vout is produced based on the output-voltage detection signal Sout output from the output voltage detector. The output produced period may be referred to as "OFF period" because the switching device Q is off during this period and therefore the excitation current is not applied to the step-up transformer 10.

The zero-crossing circuit 15 of the first embodiment outputs, as a zero-crossing signal Zx, a signal that is in a high level throughout a period from a point in time when the output-voltage detection signal Sout becomes slightly positive to a point in time when the same goes to the zero level but in a low level in the other period. The output produced period is the period when the zero-crossing signal Zx is in the high level.

The inverter device 1 further includes a comparator circuit 18 as the comparator that compares the input-voltage detection signal Sin output from the input-voltage detection circuit 14 and the output-voltage detection signal Sout output from the tertiary winding Nd which is the output voltage detector. The comparator circuit 18 detects a period (hereinafter, "output-high period") during which the output-voltage detection signal Sout is higher than the input-voltage detection signal Sin and outputs a signal Sc that is in a high level only during the output-high period.

The inverter device 1 further includes a shift register 19 as the shifting unit that causes the signal Sc, which is information indicating the output-high period detected by the comparator circuit 18, to shift to a next period in which the zero-crossing signal Zx output from the zero-crossing circuit 15 serving as the output-produced-period detector goes to the low level.

The information indicating the thus-shifted output-high period, which is shifted by the shift register 19, is transmitted to the control IC 12 by controlling a transistor Tr connected between the control IC 12 and the ground. The control IC 12 that performs the PWM control adjusts ON period in which the switching device Q is to be switched on based on the information.

The inverter device 1 further includes an oscillator (OSC) 17, an inverting circuit 16, AND circuits 20 and 22, and a D-FF (D-type flip flop) circuit 21. The oscillator 17 generates a clock signal CLK used by the shift register 19. The inverting circuit 16 inverts the zero-crossing signal Zx into an inverted zero-crossing signal /Zx.

Operations and functions of these elements are described later with reference to FIGS. 2 and 3.

A principle according to which an inverter device according to an embodiment of the present invention controls output voltage is described below.

The above-described three detection signals are involved in the output voltage control. The detection signals are:

the input-voltage detection signal Sin obtained by detecting the input voltage Vin, the output-voltage detection signal Sout obtained by detecting the output voltage Vout, and the zero-crossing signal Zx indicating an output-produced-period detecting a period during which the output voltage is produced from the output-voltage detection signal Sout.

Detection of the output-voltage detection signal Sout is performed indirectly by detecting the voltage, which fluctuates in the same manner as the output voltage, across the tertiary winding Nd of the transformer T1 illustrated in FIG. 1 rather than directly detecting a crest value of the output voltage Vout.

The period when the output voltage is produced can be determined from output inductance and stray capacitance of the step-up transformer 10 and resonance period of the load capacitance Co. In the first embodiment, the zero-crossing circuit 15 detects a period in which the output-voltage detection signal Sout has a positive voltage waveform as the zero-crossing signal Zx.

The following equation holds between the input voltage Vin and the excitation current Ip that excites the step-up transformer 10:

$$Vin(t) = Lp \cdot Ip(t)/dt,$$

where Lp is excitation inductance of the step-up transformer. Accordingly, the excitation current Ip is a differential coefficient of the input voltage Vin in an infinitesimal time slice. Therefore, the excitation current Ip is proportional to the input voltage Vin ($Ip \propto Vin$).

From this relationship, the excitation energy accumulated in the step-up transformer 10 is determined as follows. When excitation inductance of a single transformer is denoted by Lp, excitation inductance of the step-up transformer 10 that uses two transformers, in which excitation windings are parallel-connected, is Lp/2.

Hence, excitation energy e accumulated in the two transformers can be determined from a final value (electric current Id(Q) that flows through the switching device Q) of the excitation current of the two transformer as expressed by the following equation (1).

$$\in = (1/2) \cdot (Lp/2) \cdot Id(Q)^2 \qquad (1)$$

Switching-device-on time Ton, which is time from when the switching device Q is switched on to when the same is switched off, can be differentiated in infinitesimal time intervals. Accordingly, the final value Id(Q) of the excitation windings can be obtained from the following equation (2).

$$Id(Q) = Vin \cdot Ton/Lp \qquad (2)$$

By substituting the equation (2) to the equation (1), the amount of energy to be applied to the two transformers in a single cycle can be obtained as given by the following equation (3).

$$\varepsilon = (1/4) \cdot Lp \cdot (Vin \cdot Ton/Lp)^2 \qquad (3)$$

$$= (Vin \cdot Ton)^2 / 4Lp$$

Therefore, the amount of energy to be applied to the step-up transformer 10 made up of n transformers is determined by the following equation (4).

$$\in = (Vin*Ton)^2/(2n*Lp) \qquad (4)$$

Thus, the output power depends on how much energy is accumulated in the transformers involved in the equation (4). If Ton is constant, the output power is obtained as Vin/Lp, which is the gradient of the hypotenuse of the right angled triangle, of the equation (2).

Lp depends only on a linear portion of DC-superposition characteristics NI (the product of the coil turns N and the electric current I). If the input voltage Vin is an AC voltage, Lp depends also on fluctuation of the AC voltage in each alternating cycle. If the input voltage Vin is a DC voltage, Lp depends on a voltage deviation. Thus, the excitation current Ip determines the magnitude of the output power. Therefore, if the input voltage Vin and the load 2 are fixed, it is required to change the excitation current Ip depending on the product of Vin and Ton.

In the first embodiment, changing the excitation current Ip depending to the product is performed with reference to the input-voltage detection signal Sin. The input-voltage detection signal Sin is compared against the output-voltage detection signal Sout in the OFF period. An output-high period signal Sci in which the output-voltage detection signal Sout exceeds the input-voltage detection signal Sin is shifted to a next ON period.

The shifting may preferably be performed in the following manner. The clock signal CLK having a frequency higher than or, more specifically, at least ten times higher than the switching frequency (i.e., having a cycle period of one-tenth of that of the switching frequency or shorter) is output from the oscillator 17. The output-high period signal is chopped with the clock signal CLK. The magnification ratio of the frequency of the clock signal CLK to the switching frequency is hereinafter referred to as "resolution".

How the inverter device illustrated in FIG. 1 performs the output voltage control is described below with reference to FIGS. 2 and 3.

Figure 2:
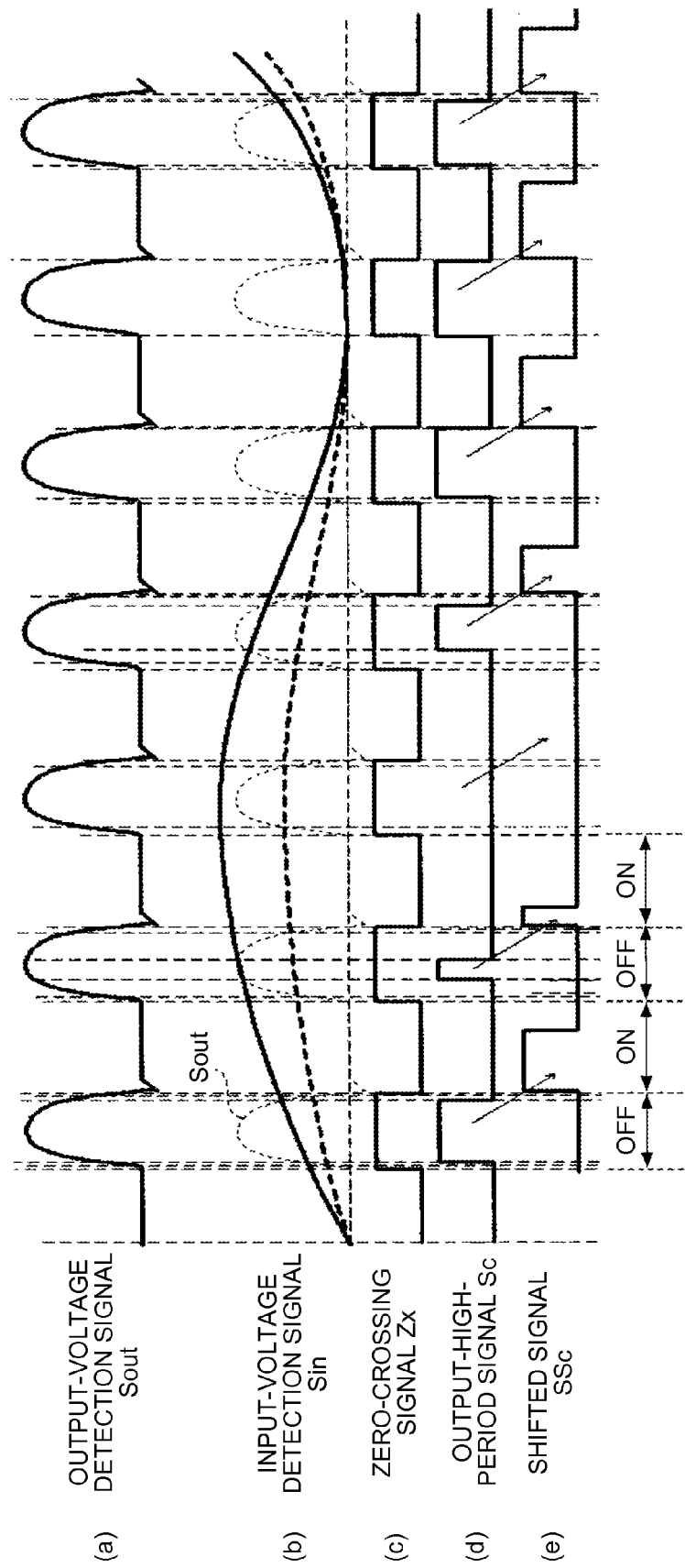
FIG. 2 is a timing diagram illustrating waveforms of signals for describing operation of the inverter device illustrated in FIG. 1.
Figure 3:
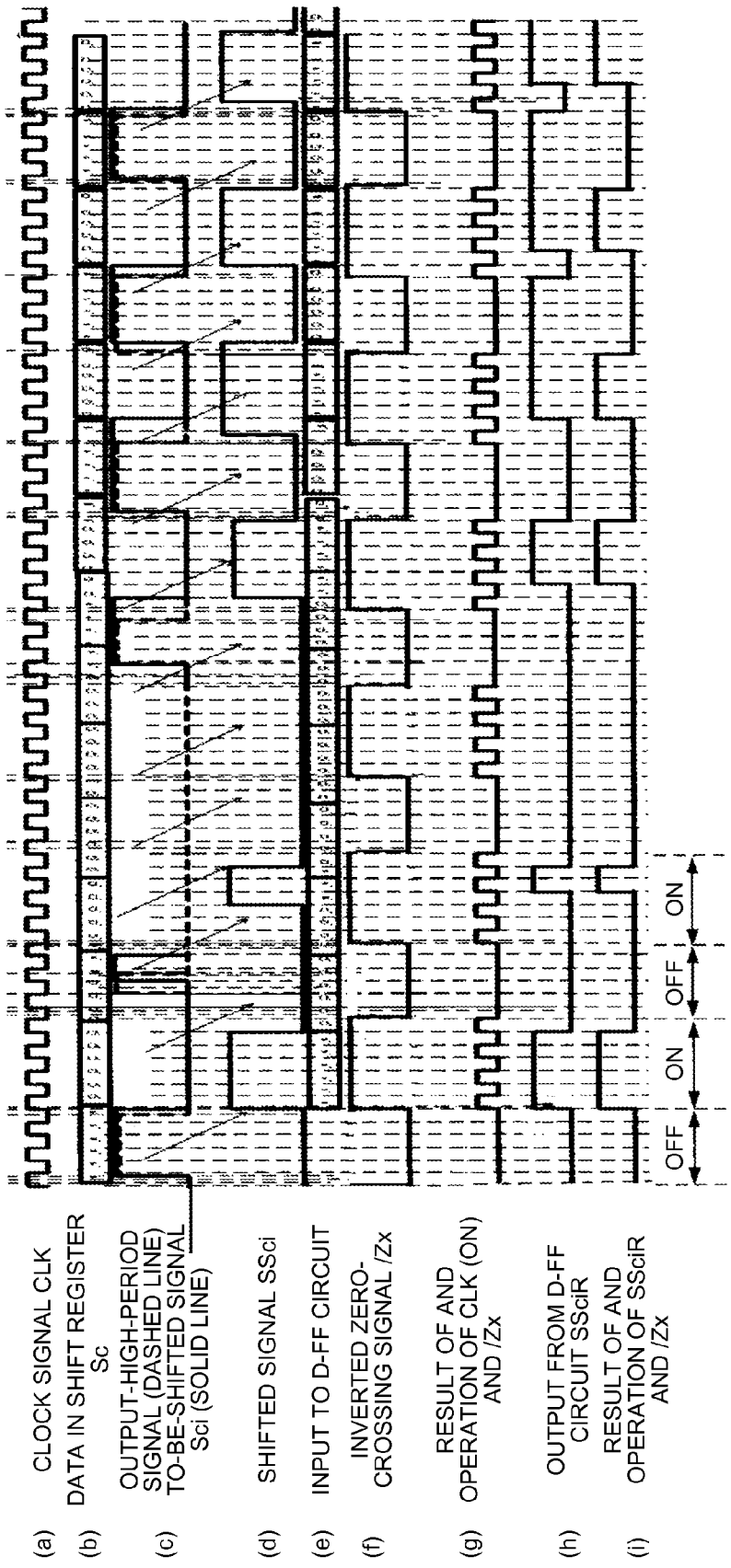
FIG. 3 is a timing chart continued from FIG. 2 illustrating the waveforms of the signals for describing the operation.

FIGS. 2 and 3 are timing charts illustrating waveforms of the signals for describing operation of the inverter device illustrated in FIG. 1.

Referring FIGS. 2 and 3, ON period and OFF period are alternately repeated. One switching cycle contains an ON period and an OFF period. The OFF period is a period when the switching device Q illustrated in FIG. 1 is off, the excitation current Ip is not applied to the step-up transformer 10, and the output voltage Vout is produced. Note that the output voltage Vout is not necessarily produced throughout the OFF period.

The ON period is a period when the switching device Q is switched on and the excitation current Ip is applied to the step-up transformer 10 to accumulate energy therein. Note that the switching device Q is not necessarily switched on throughout the ON period. Control is performed to vary the period (hereinafter, the "switching-device-on time") when the switching device Q is to be actually switched on so that the crest value of the output voltage is kept constant even when the input voltage varies.

A waveform of the output-voltage detection signal Sout is presented in (a) of FIG. 2. The output-voltage detection signal Sout is a signal exhibiting a positive half-wave waveform and fluctuates in the same manner as the output voltage Vout in synchronization therewith. Crest values of the output-voltage detection signal Sout are in a range from one-thousandth to one-hundredth of the output voltage Vout and therefore approximately several to several tens of volts (preferably, approximately 10 volts).

A waveform of the input-voltage detection signal Sin is presented in (b) of FIG. 2. The amplitude of the input-voltage detection signal Sin fluctuates between, for example, the waveform represented by a solid line and the waveform represented by a dashed line depending on the full-wave-rectified input voltage Vin(DC). The waveform, which is represented by a dotted line, of the output-voltage detection signal Sout against which the input-voltage detection signal Sin is to be compared is overlaid on the waveform.

A waveform of the zero-crossing signal Zx is presented in (c) of FIG. 2. The zero-crossing signal Zx is a signal detected by the zero-crossing circuit 15 which is the output-produced-period detector that detects an output produced period in which the output voltage Vout is produced based on the output-voltage detection signal Sout. The zero-crossing signal Zx is a signal that is in the high level throughout a period from a point in time when the output-voltage detection signal Sout becomes slightly positive to a point in time when the same goes back to the zero level but in the low level throughout the other period. The output produced period is the period when the zero-crossing signal Zx is in the high level.

A waveform of the output-high-period signal Sc is presented in (d) of FIG. 2. The output-high-period signal Sc indicates a period (Sout>Sin) when the output-voltage detection signal Sout exceeds the input-voltage detection signal Sin and is detected by the comparator circuit 18 by making comparison between the input-voltage detection signal Sin and the output-voltage detection signal Sout. The period when Sout>Sin holds (hereinafter, the "Sout>Sin period") is the period when the output-high-period signal Sc is in the high level.

A waveform of a signal obtained by shifting information indicating the output-high period (the Sout>Sin period) of the output-high-period signal Sc to a next ON period in which the zero-crossing signal Zx goes to the low level (i.e., the output-high period is not detected any more) is presented in (e) of FIG. 2. The shifting unit will be described later with reference to FIG. 3.

The control IC 12 illustrated in FIG. 1 adjusts the switching-device-on time, which is the period when the switching device Q is to be actually switched on, based on the information indicating the thus-shifted output-high period.

The clock signal CLK output from the oscillator 17 is presented in (a) of FIG. 3. For convenience, an example in which the frequency of the clock signal CLK is six times higher than (i.e., the cycle length is one-sixth of) the switching frequency is illustrated. However, in practice, the frequency of the clock signal CLK is desirably ten times the switching frequency or higher. The higher the frequency of the clock signal CLK becomes, the higher the resolution becomes. Sampling error incurred by the shift register 19 when sampling the output-high-period signal Sc is 5% when the switching frequency is divided by 20, but 10% when the switching frequency is divided by 10.

A waveform of the output-high-period signal Sc is represented by the thick dashed line in (c) of FIG. 3. The output-high-period signal Sc indicates the period when the value (level) of the output-voltage detection signal Sout exceeds the value (level) of the input-voltage detection signal Sin and is obtained by the comparator circuit 18 by making comparison therebetween. The Sout>Sin period is the period when the output-high-period signal Sc is in the high level.

Data in each stage of the six-stage shift register 19, to which the output-high-period signal Sc is fed and in which the output-high-period signal Sc is shifted in sync with the clock signal CLK fed to the clock terminal of the shift register 19, is presented in (b) of FIG. 3. The shift register 19 latches data at rising edges of the clock signal CLK. Accordingly, the shift register 19 latches "1" if the output-high-period signal Sc is in the high level at a rising edge, but latches "0" if the same is in the low level.

A waveform of an output-high-period signal Sci fed to the shift register 19 having the 6 times resolution is represented by a thick solid line in (c) of FIG. 3 as described above. There is a difference between this signal and the output-high-period signal Sc represented by the thick dashed line and indicating the actual Sout>Sin period. However, by dividing the frequency of the clock signal CLK to one-tenth of the switching frequency or shorter and, in accordance therewith, increasing the number of stages of the shift register to ten or more, the difference can be reduced to 10% or smaller.

Thereafter, the data latched by the shift register 19 in sync with the clock signal CLK is shifted to a next ON period (period in which the zero-crossing signal Zx is low). Each time the seventh or subsequent clock signal is fed to the shift register 19, data fed earlier is output in a first-in, first-out manner.

A waveform of an output-high-period signal SSci, which is the signal undergone the shifting, is presented in (d) of FIG. 3. Thus, the shift register 19 which is the shifting unit shifts information indicating an output-high period to a next period (ON period) in which the zero-crossing circuit 15 does not detect the output produced period any more in synchronization with the clock signal CLK whose frequency is higher than the switching frequency.

This signal SSci is sequentially applied to data terminal of the D-FF circuit 21 illustrated in FIG. 1. Accordingly, "1" is input to the D-FF circuit 21 when the signal SSci is high, but "0" is input when the signal SSci is low. Input data of the D-FF circuit 21 is presented in (e) of FIG. 3.

A waveform of the inverted zero-crossing signal /Zx obtained by inverting the zero-crossing signal Zx illustrated in (c) of FIG. 2 by the inverting circuit 16 illustrated in FIG. 1 is presented in (f) of FIG. 3.

A clock signal obtained from AND operation performed by applying the clock signal CLK and the inverted zero-crossing signal /Zx to the AND circuit 20 is presented in (g) of FIG. 3. This clock signal is output only during a period when the inverted zero-crossing signal /Zx is high. The D-FF circuit 21 also latches data input to its data terminal D at rising edges of the clock signal and outputs the latched data from its terminal Q.

Accordingly, the D-FF circuit 21 lathes the shifted output-high-period signal SSci output from the shift register 19 and presented in (d) at rising edges of the clock signal CLK(ON) presented in (g) of FIG. 3. A waveform of the output signal at the terminal Q of the D-FF circuit 21 is presented in (i) of FIG. 3.

The AND circuit 20, the D-FF circuit 21, and the like correspond to the information transmitting unit that transmits the information (the signal SSci) indicating the output-high period shifted by the shift register 19 to the control IC 12, which is the control circuit, only during the period (period when Zx is low) when the zero-crossing circuit 15 detects absence of the output produced period.

However, each of two high level portions of the waveform of a signal SSciR presented at the right side in (h) of FIG. 3 extends to the OFF period which is the output produced period. A part of the information corresponding to the OFF period is unneeded because an excitation current cannot be applied in the OFF period.

To eliminate this unneeded part, in the first embodiment illustrated in FIG. 1, the AND circuit 22 is provided so that the signal presented in (i) of FIG. 3 obtained by AND operation of the signal SSciR output from the D-FF circuit 21 with the inverted zero-crossing signal /Zx presented in (f) of FIG. 3 is output. The AND circuit 22 corresponds to the unit that disables transmission of the information (signal SSci) indicating the output-high period to the control IC 12 during a period (period when /Zx is low) when the zero-crossing circuit 15 detects an output produced period.

The output signal of the AND circuit 22 is applied to the base of the transistor Tr illustrated in FIG. 1. As a result, the transistor Tr is switched on only during the period when the output signal is in the high level or, put another way, only during the period (Sout>Sin period) when the output-voltage detection signal Sout exceeds the input-voltage detection signal Sin in an immediately preceding OFF period. Accordingly, the terminal of the control IC 12 to which the transistor Tr is connected is placed at the ground potential only during the Sout>Sin period, and information about the period when Sout>Sin holds is transmitted to the control IC 12.

By making use of this configuration, the control IC 12, which is the control circuit, adjusts or determines the period in which the switching device Q is to be actually switched on based on the information (signal SSci) indicating the output-high period shifted by the shift register 19 so as to keep the crest value of the output voltage Vout constant.

For instance, when the output-high period is longer than a reference value, the input voltage is low. In this case, the control IC 12 may lengthen the period (switching-device-on time) when the switching device Q is to be switched on. When the output-high period is shorter than the reference value, the input voltage is high. In this case, the control IC 12 may shorten the period (switching-device-on time) when the switching device Q is to be switched on.

Operation of an inverter device according to a second embodiment which partially differs from the inverter device according to the first embodiment is described below with reference to the timing chart illustrated in FIG. 4.

(a) and (b) of FIG. 4 correspond to (b) and (d) of FIG. 2 where, respectively, the input-voltage detection signal Sin and the output-high-period signal Sc which is a result of comparison made by the comparator circuit 18 are presented. The output-high-period signal Sc is a signal that goes to the high level only during a period when the value (level) of the output-voltage detection signal Sout exceeds the value (level) of the input-voltage detection signal Sin.

In the second embodiment, the AC input voltage Vin from the commercial power source is subjected to full-wave rectification provided by the full-wave rectifier circuit illustrated in FIG. 1 and, after being smoothed by a capacitor or the like, applied to a series circuit of the excitation windings of the step-up transformer 10 and the switching device Q. Similarly, the input-voltage detection circuit 14 full-wave rectifies the AC input voltage Vin from the commercial power source and thereafter smooths the rectified input voltage using a capacitor or the like to output the input-voltage detection signal Sin. The second embodiment is similar to the first embodiment described above excluding the above-described difference.

According to the second embodiment, the input-voltage detection signal Sin linearly changes at mild rates as presented in (a) of FIG. 4. The voltage level of the input-voltage detection signal Sin fluctuates relative to reference values represented by a solid line in FIG. 4 between maximum values represented by a thick dashed line and minimum values represented by a dotted line.

A waveform of the output-voltage detection signal Sout is also presented by a dotted line in (a) of FIG. 4. Accordingly, such a signal as that presented in (b) of FIG. 4 is obtained as the output-high-period signal Sc indicating the period which is obtained through a comparison between the input-voltage detection signal Sin and the output-voltage detection signal Sout and in which the output-voltage detection signal Sout exceeds the input-voltage detection signal Sin.

In the second embodiment, the control IC 12 adjusts the switching-device-on time, during which the switching device Q is to be switched on, based on information indicating the range indicated by short and long arrows in FIG. 4, thereby controlling the output voltage so as to have a constant crest value.

This control increases accuracy in detection of fluctuation in the input voltage.

The above-described inverter device according to an aspect of the present invention keeps a crest value of the output voltage constant by using an input-voltage detection signal as a reference. For this purpose, control of modulating the switching-device-on time Ton depending on the input voltage Vin is performed in a same cycle based on the relationship expressed as $Ip = Vin \cdot Ton/Lp$ where Ip is the excitation current, Vin is the input voltage, Lp is the excitation inductance, and Ton is the switching-device-on time. Accordingly, a stable and fast-response output voltage can be obtained even when the input voltage varies.

When controlling a ratio between ON period and OFF period of a switching device by PWM, the shorter the ON period becomes, the longer the OFF period becomes. Accordingly, reducing the ON period can lead to generation of a continuous resonant output voltage. However, control of modulating only the ON period while fixing the OFF period can be provided by additionally employing a function of detecting an electric current flowing through the switching device and switching off the switching device upon detecting that the current reaches a predetermined value. This control allows to obtain a stable and faster-response output voltage.

In addition, a stable output voltage may be obtained by determining the ON period of the switching device in advance based on the input-voltage detection signal and controlling based on the ON period.

In the plasma generator apparatus according to an aspect of the present invention, a sheet material is conveyed through the discharging unit along the dielectric, so that the surface of the sheet material is reformed by contact with active species such as radicals and ions generated by plasma.

More specifically, various groups such as hydrophilic functional groups containing elements of air or elements of the sheet material are formed on the surface of the sheet material, and surface energy of the sheet material is increased, whereby the thus-increased surface energy induces reforming.

Such atmospheric pressure plasma as that described above is applied to various industrial products as one means for surface treatment such as improvement of surface quality or removal of contamination. Applying atmospheric pressure plasma as pre-treatment of adhesion, printing, coating or the like of a resin or the like can improve wettability.

For example, in an attempt of coating a printed material, which is printed by an electrophotographic image forming apparatus using resin toner, with ultraviolet-curable varnish, the varnish deposited on a portion printed with the resin toner may be repelled by a wax component contained in the resin toner. However, applying surface treatment using atmospheric plasma increases wettability, and allows to coat with varnish, whereby the surface treatment enhances added value of the printed material.

Application of the plasma generator apparatus according to an aspect of the present invention is not limited to generation of atmospheric plasma. The plasma generator apparatus can be modified in various manners. The plasma generator apparatus is further applicable to apparatuses that generate plasma by corona discharge and apparatuses that generate plasma discharge in a low-pressure ambient where a small amount of gas is present.

The inverter device according to an aspect of the present invention can be utilized not only in a plasma generator apparatus but also in a high-voltage power supply of various apparatuses including semiconductor-wafer bonding apparatuses, image processing apparatuses, coating apparatuses, lighting devices such as fluorescent lamps, air cleaners, discharging devices, backlight of liquid-crystal displays, and sterilizing devices.

It should be understood that modifications, additions, and partial omissions can be made as appropriate to circuit examples, operation example, modifications, and the like of each embodiment described above. The examples may be implemented by being combined as appropriate so long as no contradiction arises.

An inverter device according to an aspect of the present invention is capable of controlling its AC output voltage so as to have a constant crest value even when its input voltage varies.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An inverter device comprising:
    a switching device configured to perform on-off switching of an input voltage in accordance with on-off control provided by a control circuit;
    a step-up transformer including an excitation winding and an output winding and configured to apply an excitation current to the excitation winding during a period in which the switching device is on but output an output voltage exhibiting a half-wave alternating-current waveform from the output winding during a period in which the switching device is off;
    an input-voltage detector configured to detect a state of the input voltage by detecting a voltage value of the input voltage;
    an output voltage detector configured to detect a state of the output voltage by detecting an instantaneous voltage value of the output voltage;
    an output-produced-period detector configured to detect an output produced period during which the output voltage is produced based on the output-voltage detection signal output from the output-voltage detector;
    a comparator configured to detect an output-high period during which the output-voltage detection signal exceeds the input-voltage detection signal by making comparison between the input-voltage detection signal output from the input-voltage detector and the output-voltage detection signal output from the output-voltage detector; and
    a shifting unit configured to shift the information indicating the output-high period detected by the comparator to a next period in which the output-produced-period detector detects absence of the output produced period, wherein
    the control circuit is configured to adjust the period in which the switching device is to be switched on based on information indicating a shifted output-high period, the shifted output-high period being the output-high period shifted by the shifting unit.

2. The inverter device according to claim 1, wherein the control circuit adjusts the period during which the switching device is to be switched on so that the longer the output-high period is than a reference value, the longer the switching-device-on period is, and vice versa.

3. The inverter device according to claim 1, wherein the shifting unit samples the information indicating the output-high period in synchronization with a clock signal having a frequency higher than a frequency of the switching, and shifts the information to a next period in which the output-produced-period detector detects absence of the output produced period.

4. The inverter device according to claim 1,
    wherein the step-up transformer includes a tertiary winding, and
    the output voltage detector detects a voltage, the voltage exhibiting a waveform having a crest value lower than a crest value of a waveform of the output voltage, produced across the tertiary winding in synchronization with the output voltage as the output-voltage detection signal.

5. The inverter device according to claim 1,
    wherein the step-up transformer includes a plurality of transformers identical in characteristics and each having an independent core,
    the excitation current is simultaneously applied to each of excitation windings of the plurality of transformers, the excitation windings being connected in any one of a parallel configuration and a series configuration, and
    the output voltage is output from output windings of the plurality of transformers, the output winding being connected in any one of a parallel configuration and a series configuration.

6. A plasma generator apparatus comprising;
    the inverter device according to claim 1; and
    a charging unit serving as a load of the inverter device, the charging unit including a discharge electrode and a counter electrode, the output voltage to be applied across the discharge electrode and the counter electrode,
    the discharge electrode and the counter electrode generating plasma.

7. The inverter device according to claim 1, further comprising an information transmitting unit configured to transmit the information indicating the output-high period to be shifted by the shifting unit to the control circuit only during a period when the output-produced-period detector detects absence of the output produced period.

8. The inverter device according to claim 7, further comprising a unit configured to disable transmission of the information indicating the output-high period to the control circuit during a period when the output-produced-period detector is detecting the output produced period.

9. The inverter device according to claim 7, wherein the information transmitting unit transmits the information indicating the output-high period to be shifted by the shifting unit to the control circuit in synchronization with a clock signal having a higher frequency than that of the switching.

10. A control method employed in an inverter device comprising:
    performing, at a switching device, on-off switching of an input voltage in accordance with on-off control provided by a control circuit;
    applying, at a step-up transformer, an excitation current to an excitation winding during a period in which the switching device is on but output an output voltage exhibiting a half-wave alternating-current waveform from an output winding during a period in which the switching device is off;

detecting, at an input-voltage detector, a state of the input voltage by detecting a voltage value of the input voltage;

detecting, at an output voltage detector, a state of the output voltage by detecting an instantaneous voltage value of the output voltage;

detecting, at an output-produced-period detector, an output produced period during which the output voltage is produced based on the output-voltage detection signal output from the output-voltage detector;

detecting, at a comparator, an output-high period during which the output-voltage detection signal exceeds the input-voltage detection signal by making comparison between the input-voltage detection signal output from the input-voltage detector and the output-voltage detection signal output from the output-voltage detector; and shifting, at a shifting unit, the information indicating the output-high period detected by the comparator to a next period in which the output-produced-period detector detects absence of the output produced period, wherein the control method further includes adjusting, at the control circuit, the period in which the switching device is to be switched on based on information indicating a shifted output-high period, the shifted output-high period being the output-high period shifted by the shifting unit.

\* \* \* \* \*